United States Patent
Anderson et al.

(10) Patent No.: US 10,810,087 B2
(45) Date of Patent: *Oct. 20, 2020

(54) DATACENTER MAINTENANCE

(71) Applicant: EMC Corporation, Hopkinton, MA (US)

(72) Inventors: David S. Anderson, Salt Lake City, UT (US); Ray D. Whitmer, Pleasant Grove, UT (US); Kenneth Russo, Louisville, CO (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 395 days.

This patent is subject to a terminal disclaimer.

(21) Appl. No.: 15/819,595

(22) Filed: Nov. 21, 2017

(65) Prior Publication Data

US 2018/0095987 A1  Apr. 5, 2018

Related U.S. Application Data

(63) Continuation of application No. 14/319,991, filed on Jun. 30, 2014, now Pat. No. 9,824,093.

(51) Int. Cl.
*G06F 16/00* (2019.01)
*G06F 11/14* (2006.01)
*G06F 16/10* (2019.01)
*G06F 16/11* (2019.01)

(52) U.S. Cl.
CPC .......... *G06F 11/1451* (2013.01); *G06F 16/10* (2019.01); *G06F 16/11* (2019.01)

(58) Field of Classification Search
CPC .. G06F 11/1451; G06F 16/10; G06F 11/1453; G06F 3/0652; G06F 3/067; G06F 3/0608; G06F 16/11
See application file for complete search history.

(56) References Cited

U.S. PATENT DOCUMENTS

| | | | |
|---|---|---|---|
| 6,430,608 B1 * | 8/2002 | Shaio | H04L 63/102 709/217 |
| 7,801,871 B2 | 9/2010 | Gosnell | |
| 8,108,347 B2 * | 1/2012 | Lara | G06F 11/0709 707/638 |
| 8,307,003 B1 * | 11/2012 | Sheth | G06F 16/958 707/790 |
| 8,850,455 B1 | 9/2014 | Bachu et al. | |
| 8,868,505 B1 | 10/2014 | Jayanthi | |
| 8,959,067 B1 * | 2/2015 | Patiejunas | G06F 16/2228 707/696 |
| 9,736,121 B2 * | 8/2017 | Mraz | H04L 63/0428 |
| 2003/0149683 A1 | 8/2003 | Lee et al. | |

(Continued)

OTHER PUBLICATIONS

Zeyu Zheng et al., Coordinated resource provisioning and maintenance scheduling in cloud data centers, 2013, IEEE, 345-349.

*Primary Examiner* — Alexander Khong
(74) *Attorney, Agent, or Firm* — Workman Nydegger

(57) ABSTRACT

Systems and methods for maintaining a datacenter are provided. A repair component includes modules that are configured to scan the data objects based on the identifiers of the data objects, identify potential issues or concerns with the data objects, and then repair the issues as they are discovered or over time. The repair component can be run in a non-centralized and highly parallelized manner.

19 Claims, 6 Drawing Sheets

(56) References Cited

U.S. PATENT DOCUMENTS

| | | |
|---|---|---|
| 2007/0038857 A1 | 2/2007 | Gosnell |
| 2009/0006640 A1* | 1/2009 | Brouwer ................. G06F 11/10 709/231 |
| 2014/0181027 A1* | 6/2014 | Whitehead .............. G06F 11/14 707/639 |
| 2014/0181034 A1* | 6/2014 | Harrison ............. G06F 11/1453 707/646 |
| 2014/0181039 A1* | 6/2014 | Harrison ............... G06F 3/0608 707/652 |
| 2014/0181041 A1* | 6/2014 | Whitehead .......... G06F 11/1448 707/652 |
| 2014/0181579 A1* | 6/2014 | Whitehead .......... G06F 11/1451 714/15 |
| 2015/0358408 A1* | 12/2015 | Fukatani ............. H04L 67/1097 709/204 |

\* cited by examiner

DATACENTER MAINTENANCE

CROSS-REFERENCE TO RELATED APPLICATIONS

The present application is a Continuation of U.S. patent application Ser. No. 14/319,991, filed Jun. 30, 2014, and issued on Nov. 21, 2017 as U.S. Pat. No. 9,824,093, which is hereby incorporated by reference in its entirety.

FIELD OF THE INVENTION

Embodiments of the present invention generally relate to systems and methods for protecting or maintaining data. More particularly, embodiments of the invention relate to systems and methods for maintaining data stored in datacenters and other storage devices.

BACKGROUND

With increasing frequency, data is migrating to the cloud and much of the data in the cloud is maintained in datacenters. Datacenters are typically large facilities that have the capacity to store extremely large amounts of data from a large number of different users. The amount of data stored in a datacenter can be very large (e.g., on the order of Petabytes).

Datacenters are often used to backup data. Once a user has backed up data to the datacenter, the datacenter has the responsibility to maintain the data such that the data is available when needed and such that the data can be restored. However, maintaining the data is challenging at least because data is continually being added to the datacenter and because the user's data often changes. In addition, hardware issues may often occur in datacenters and data or portions thereof are frequently lost.

For example, a user may upload a group of files to a datacenter. Over time, the user may delete some of the files, change some of the files, or add new files. A quality backup system will be able to successfully backup the user's data regardless of the actions taken by the user.

However, this process of maintaining data in the datacenter is quite complicated for many reasons. For example, storage devices fail in a datacenter as previously stated. The data on those storage devices is therefore lost and it becomes necessary to replace the lost data. In addition, attempts may be made to deduplicate the data. As a result, the loss of a storage device or the loss of a particular piece of data may impact multiple users. In addition, datacenters often have a significant amount of data that becomes garbage data (data that can be deleted) over time. The ability to identify and remove the garbage data is a time consuming process and fraught with problems. Data that is garbage with respect to one user may be valid data with respect to another user. As a result, a datacenter must exercise care when deleting data. Systems and methods are needed to streamline and improve datacenter management.

BRIEF DESCRIPTION OF THE DRAWINGS

In order to describe the manner in which at least some aspects of this disclosure can be obtained, a more particular description will be rendered by reference to specific embodiments thereof which are illustrated in the appended drawings. Understanding that these drawings depict only example embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Figure 1:
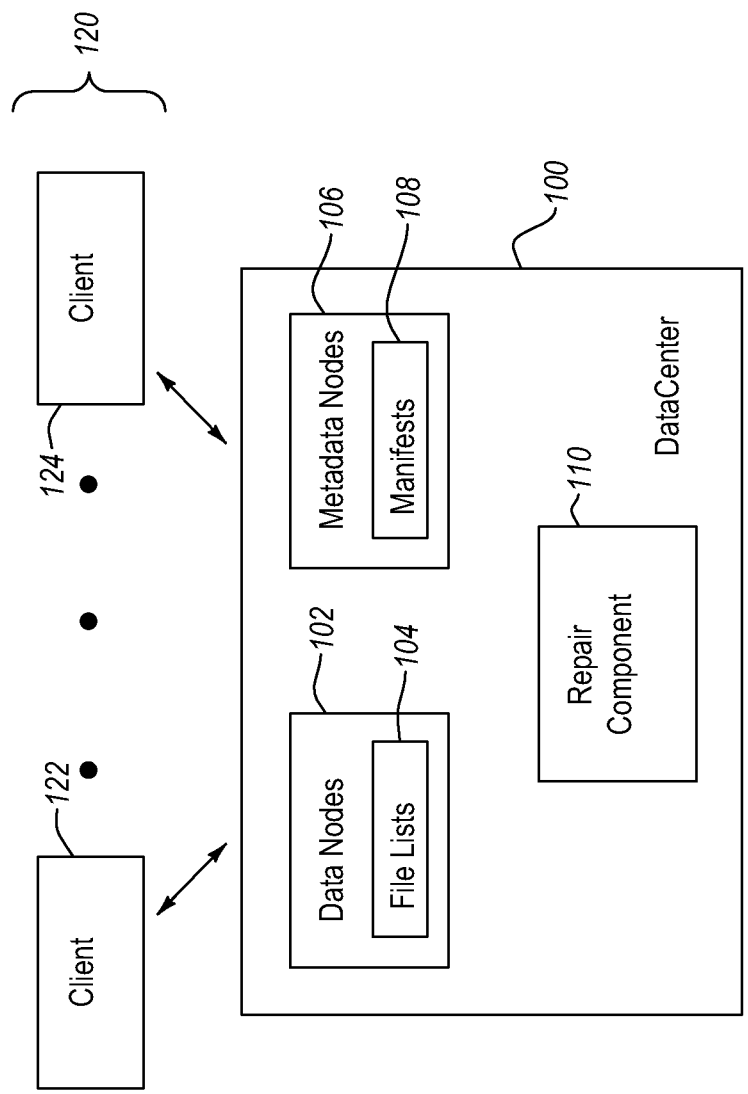
FIG. 1 illustrates an example of a data center that includes repair component configured to perform a maintenance operation on the datacenter.

Embodiments of the invention relate to systems and methods for protecting data. More specifically, embodiments of the invention relate to systems and methods for maintaining data in datacenters or other storage systems. Maintaining data can include, by way of example only, identifying data issues in a data center and resolving the identified issues. Examples of issues or problems that may occur in a datacenter or that relate to the data stored in the datacenter include, but are not limited to, data that requires repair, data that cannot be repaired, identifying and removing duplicate data, editing or fixing user manifests, identifying data that is garbage, or the like or combination thereof.

Embodiments of the invention can parallelize the maintenance of the datacenter such that the maintenance operations are not operating on stale data. When identifying issues in the datacenter, information about the data objects can be retrieved quickly. The maintenance operations often involve operations that compare object identifiers in manifests (e.g., a list of data objects that are believed to be stored in the datacenter) with object identifiers from file lists (a list of data objects that are stored in the storage devices). By parallelizing the maintenance operations and by having different instances operate on different ranges of the data objects, issues can be identified quickly and using data that is less likely to be stale. Issues with the data objects can be identifies in a single pass of databases in the datacenter.

Generally, the data used to identify issues with data objects can be retrieved from the datacenter in order. Parallelizing the maintenance operations as discussed herein using multiple instances and smaller ranges allows the amount of data to be more manageable. Data from the databases (e.g., the manifests and the file lists) can be pulled in order and compared quickly. The data is consumed as soon as possible while minimizing the number of temporary copies that need to be made. In effect, issues can be identified with a single pass through the data in the database.

In addition, the number of databases that are present in the datacenter can be reduced and it is no longer necessary to have a single database per user. As a result, the results of the analysis can be verified quickly, which enables a further layer of protection when operating on the manifests and/or data objects stored in a datacenter.

In one example, a repair component is provided for maintaining the data in the datacenter (or other storage device or storage system). Maintaining data may include repairing data objects, removing data objects from the datacenter, managing (editing, revising, scrubbing) manifests (e.g., lists that identify the data objects of a user that should be or are stored in the datacenter), and/or deduplicating data objects stored in the datacenter. Embodiments of the invention can provide a decentralized approach for maintaining the data objects stored in a datacenter that can improve a cadence time (time to identify issues and correct the issues with the data objects) of a datacenter.

Generally, the repair component can identify issues or potential problems with data objects in a datacenter by evaluating user manifests and file lists (lists of data objects actually stored in the data center). The manifests and/or the file lists may be structured as databases. The manifests and file lists can be evaluated, for example, by comparing the manifests and the file lists to identify matches and to identify entries that do not have a corresponding match. This comparison results in actionable items that can be prioritized and resolved. In one example, the manifests and file lists are evaluated in a sorted order because each data object can be identified by a finger print (e.g., a message digest, a sha code) that can be sorted. As a result, the manifests and files lists within a particular range (e.g., all those beginning with 0000) can be evaluated in order.

The data protection operation(s) performed by the repair component can be performed continually and repeatedly. This is useful in part because the data stored in the datacenter is continually changing. In addition, the data protection operation performed by the repair component can be parallelized or distributed. For example, multiple instances of the repair component (or modules thereof) may be running simultaneously on different machines. In one example, each instance may focus on a particular or on an identifiable portion of the data stored in the datacenter (e.g., a range of the data). Advantageously, embodiments of the invention can reduce the time required to scan the data in the datacenter. While conventional maintenance operations require days to scan the datacenter, embodiments of the invention can perform maintenance operations, for example, in less than a day.

The repair component generally includes one or more modules that can operate together, separately, simultaneously, or the like. The repair component includes a scanner module that is tasked with the initial discovery of the manifest and the file lists or file entries. The manifest and file lists are often organized in terms of hash values or sha codes. Once these lists are obtained, the scanner module can organize the lists (e.g., sort the lists) and iterate through these lists while performing an analysis on the entries in the lists. Due to the large size of data in a datacenter, the scanner module can be granularized and/or implemented in a parallelized manner. In this case, each instance of the scanner module may operate within a particular hash space or a specific portion of the data.

The analysis performed by the scanner module often includes comparing an entry in the manifest with an entry in the file list. The analysis can include determining whether an entry in the manifest has a match in the file list or does not have a match in the file lists. Similarly, the analysis can include determining whether an entry in the file list matches or does not match an entry in the manifest. In one example, all entries that match are identified and all entries in both lists that do not have a match are also identified. This process can be simplified by organizing the lists into an advantageous file structure (e.g., a heap data structure). This allows the scanner module to quickly determine whether an entry in the manifest is found in the file list and/or whether an entry in the file list is found in the manifest. The results of these comparisons can determine the action to be taken. The entries that are associated with actions to be performed may be stored in a queue and the proposed action may be identified.

The repair component also includes an executor module. The executor module performs, for example, the actions in the queue. These actions typically involve either a modification to the manifests or to changes in the data objects (or fragments of the data objects). As previously stated, the scanner module may operate in a particular space and a corresponding executor or executor module may operate in the same space. However, an executor module may be able to process entries in queues generated by different instances of the scanner module. In addition, even though an executor module may operate on a specific range of entries, it is possible that the actions performed by the executor module could be performed on or associated with any manifest.

The executor module can operate in various modes. In one example, the executor module includes a scrubbing mode. When a data object has been lost or is no longer recoverable, the executor module may scrub or remove the corresponding entry or identifier from the relevant manifests. The next time the backup client runs for the corresponding user or users, the data object is uploaded again to the datacenter.

The executor module also includes a removal mode. When data objects exist that are not referenced in any manifest (an entry in the file list is not present in the manifest), the data object is deemed old or garbage and targeted for deletion or for garbage collection. Deletion may not involve an actual deletion of the data object. However, the space occupied by that data object may be made available for other data objects. Embodiments of the invention, however, also implement protections for new data objects that may have been recently uploaded or for queue entries that are old such that data is not inadvertently affected.

The executor module also includes a deduplication mode. Deduplication, by way of example, is a process that that reduces a data object that was uploaded multiple times to exactly one copy. Data objects can be deduplicated with respect to a single client or user or with respect to multiple users. As described below, a data object is often divided into object fragments and deduplication operates to that there is exactly one copy of each object fragment of a data object. This can reduce storage space requirements.

The executor module may also include a repair mode. The repair mode operates when in a situation where the data object can be repaired. For example, the datacenter may be configured such that a data object can be reconstituted even when some of the object fragments are lost.

The repair module may optionally include a proxy service module. The maintenance operations can be performed without the proxy service module in one example. In fact, the proxy service module may be unaware of the queue and may allow access to the executor module independently of the queue. Alternatively, the proxy service module may be able to add entries to the queue independently of the scanner module. In other words, embodiments of the invention contemplate modules that are capable of cooperating with the executor module independently of the scanner module.

The repair component may be running live in a datacenter. Because the data stored in the datacenter is almost always changing, there are instances where the scanner may incorrectly identify an issue. For example, newly uploaded files are at risk of deletion or garbage collection if there is no corresponding entry in the manifests. As a result, the data objects or object fragments may be timestamped. The executor module may take no action if the file is too young or has recently been stored in the datacenter. Alternatively, the executor module may not operate on queue entries that are older than a predetermined period of time.

FIG. 1 illustrates an example of a datacenter that maintains data objects for multiple clients, each of which may be associated with a user. FIG. 1 illustrates a datacenter 100. The datacenter 100 includes computing devices that include, but are not limited to, storage devices, processors or other controllers, network devices, and the like. Generally, the datacenter 100 includes nodes that may be physical machines or that may host virtual machines, or combinations thereof. The nodes may be configured to store data objects, metadata, or both.

For example, the datacenter 100 may include data nodes 102 and metadata nodes 106. Data nodes 102 are generally configured to store data objects. The data nodes 102 may also store file lists 104. The file lists identify the data objects or data object fragments stored on the data nodes 102.

The metadata nodes 106 may be configured to store manifests 108. The manifests 108 may include lists of data objects that have been uploaded by the clients 120. Generally, each client is associated with its own manifest 108. Thus, the client 122 is associated with its own manifest and the client 124 is similarly associated with its own manifest.

In operation, the clients 120 (represented by a client 122 and/or a client 124) may upload certain files or data objects to the datacenter 100. For example, when the client 122 uploads data objects to the datacenter 100, the data objects themselves are stored in the data nodes 102 and metadata identifying the data objects may be stored in a manifest 108 that corresponds to the client 122.

In one example, the data objects may each be represented by an identifier that is unique or that has a high probability of being unique. For example, a file may be represented by a hash or by a sha code. This may be referred to in one example as a fingerprint. A sha code is an output of a cryptographic hash function in one example. The identifiers (e.g., sha codes or fingerprints) and/or file names of the data objects may be stored in the manifests 108. In other words, each entry in the manifests 108 may include an identifier (e.g., a sha code) and/or a file name, and/or other information. In some examples, some of the data in the manifests may be encrypted. This allows the datacenter 100 to maintain a list of all data objects that correspond to the client 122 or lists of data objects that correspond to other clients 120 of the datacenter 100. The data objects can also be located using the identifier. In one example, the filenames of the data objects may include the corresponding identifier.

Figure 2:
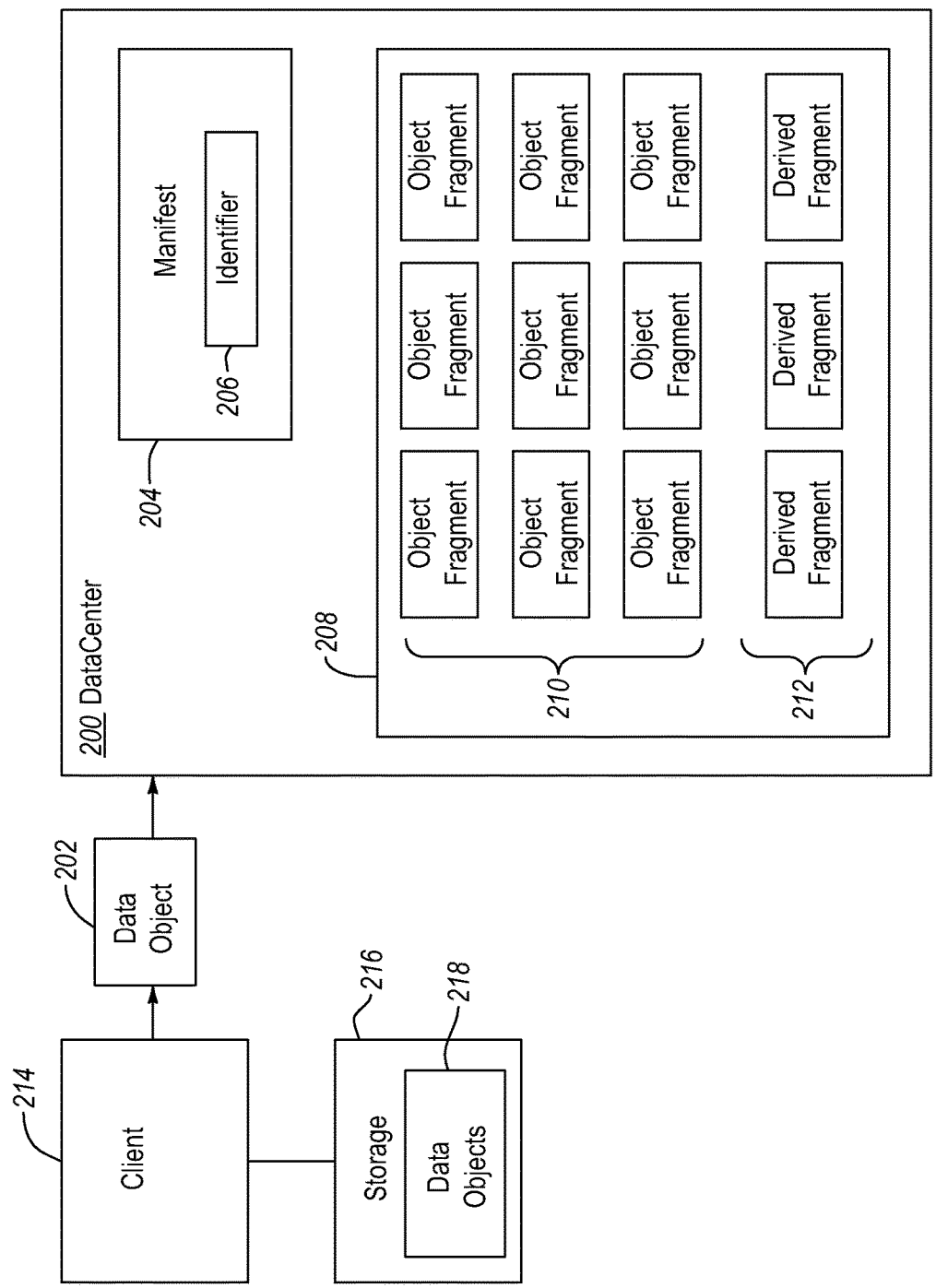
FIG. 2 illustrates an example of a data object that is incorporated into the datacenter.

FIG. 2 illustrates an example of a data object that is uploaded to and stored in a data center. The client 214 is typically associated with a storage device 216 that stores data objects 218 of the client 214. During a backup operation, the data objects 218 are uploaded to a datacenter 200, which is an example of the datacenter 100.

FIG. 2 illustrates a client 214 that uploads a data object 202 to a datacenter 200. An identifier of the data object 102 may be determined before the data object 102 is uploaded or after the data object 202 is uploaded to the datacenter 200. In one example, the data object 202 may also be encrypted prior to being uploaded to the datacenter 200. The identifier may be a unique representation of the data object as previously described.

When the data object 202 is received by the datacenter 200, an entry 206 may be made in the manifest 204 that corresponds to the client 214. This entry 206 may be made after the data object 202 is processed and stored in the datacenter 200. The entry 206 may also be made before the data object 202 is stored in the datacenter 200. The manifest 204 thus includes entries for each of data objects uploaded by the client 214. The entries in the manifest 204 can change over time as the client 214 makes changes to the data objects 218 stored in the storage 216 of the client 214. When a data object is deleted from the storage 216 or garbage collected, for example, an entry in the manifest 204 may also be removed. However, the corresponding data object stored in the datacenter 200 may not be deleted for reasons discussed in more detail below. Generally, that data object may also be associated with another client because the data center 200 may deduplicate the data objects. Alternatively, the space may be allocated for storing another data object without actually deleting the garbage data object from the storage device.

When the data object 202 is received by the datacenter 200, the datacenter 200 may divide the data object 202 into multiple data object fragments (object fragments) 208. In FIG. 2, the data object is divided into twelve object fragments 208. The number of object fragments generated from the data object may be different in other examples.

The object fragments 210 (nine in this example) are each pieces of the original data object 202. The derived fragments 212 (three in this example) are derived from the object fragments 210. Collectively, the object fragments 210 and the derived fragments 212 allow the data object 202 to be reconstructed or recreated in an event where some of the object fragments are lost.

Each of the fragments 208 is typically stored on a different node or a different storage device within the datacenter 200. The fragments 208 are configured such that if one or more of the fragments 208 are lost (e.g., a node fails), then the original data object 202 can be reconstructed from the remaining fragments 208. In one example, the data object 202 can be reconstructed from any nine of the twelve fragments. When only eight or less object fragments remain, it may be necessary to upload the data object from the client. This may include removing an entry from a corresponding manifest, which is an example of scrubbing the manifest.

Figure 3:
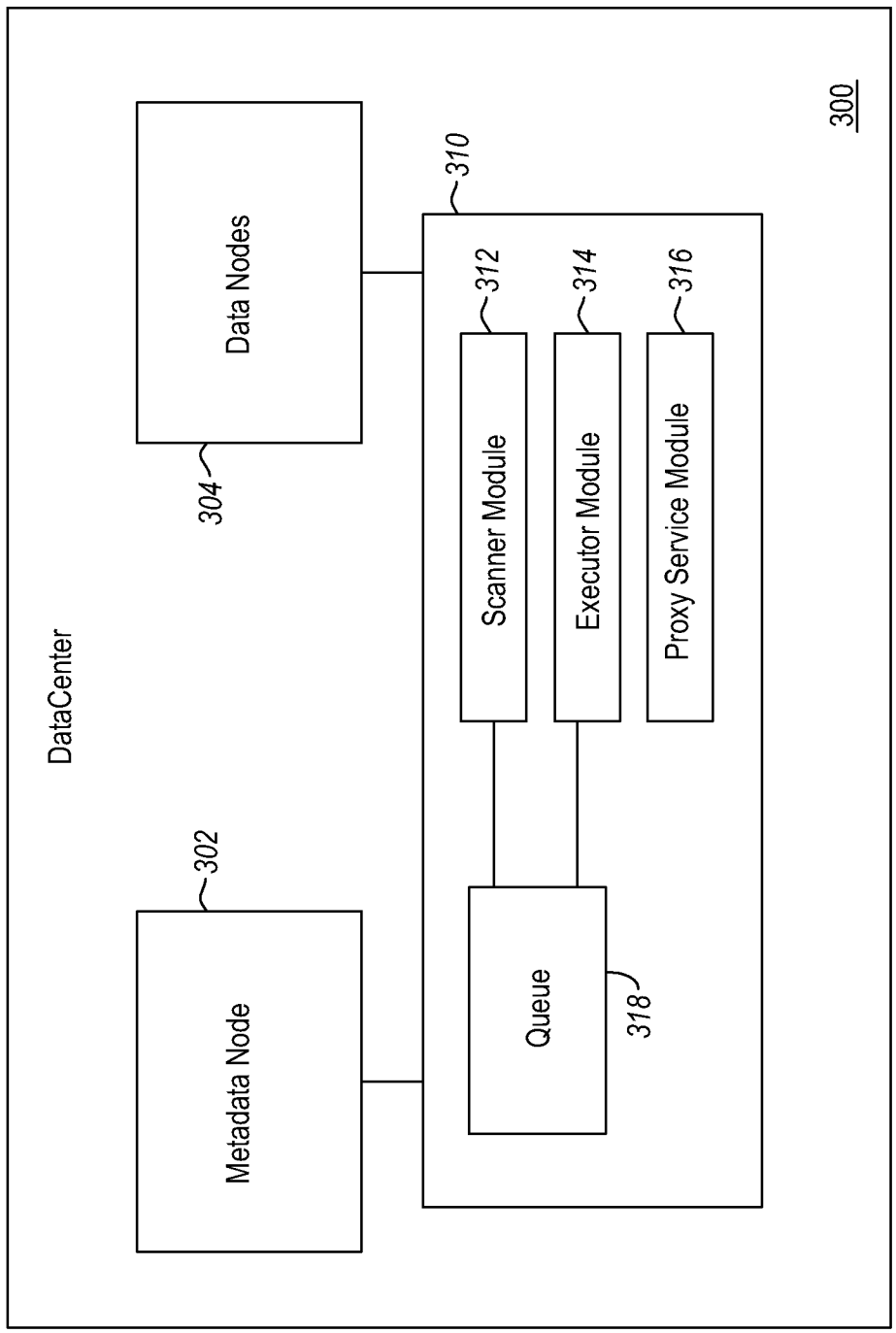
FIG. 3 illustrates an example of a datacenter that includes a repair component with multiple modules configured to scan for issues with data objects and repair the issues.

FIG. 3 illustrates another example of a data center that provides data maintenance operations. FIG. 3 illustrates a datacenter 300, which is an example of the datacenter 100. The datacenter 300 includes metadata nodes 302 and data nodes 304. The datacenter 300 may also include a repair component 310, which is an example of the repair component 110.

The repair component 310 may include a scanner module 312, an executor module 314, and, optionally, a proxy service module 316. The scanner module 312 may be configured to scan the data center in order to identify issues problems or potential problems (action items or actionable items) with the data objects stored in the datacenter 300. The scanner module 312, by example, can identify data objects that require repair, data objects that are duplicates, data objects that are garbage objects, and manifest issues.

The executor module 314 is configured to resolve the issues identified by the scanner module 312. In one example, the issues or problems identified by the scanner module 312 are placed into one or more lists or queues 318. The entries in the queue 318 may also be prioritized and can be prioritized by either the scanner module or the executor module.

The repair component 310 may include queues 318 that may include, but are not limited to, a repair queue, a scrub queue, a garbage queue, and a deduplication queue. In one example, there is a single queue that includes all action items. In another example, there is one queue associated with each manifest. Data objects in the repair queue may be associated with data objects that are missing object fragments. For example, if the scanner module determines that there are only 10 object fragments for a data object present in the datacenter, then an appropriate entry is placed in the repair queue. The executor module 214 may then repair that data object by regenerating or reconstructing the missing object fragments.

The scrub queues may be associated with data objects that cannot be repaired (e.g., missing too many object fragments). In this example, the executor module 314 may scrub the corresponding manifests to remove the entries corresponding to the data object. As a result of scrubbing the manifests, the corresponding data objects will be uploaded from at least one of the corresponding clients.

The garbage queue may be associated with data objects that have no corresponding entries in the manifests maintained by the datacenter 300. In this case, the executor module 314 may delete or garbage collect the data objects from the data nodes.

The deduplication queue may be associated with data objects or with object fragments that are duplicates. For example, the scanner module 312 may discover that a data object is associated with 13 or more object fragments. In this case, at least one of the object fragments is a duplicate. The executor module 314 may delete one of the duplicate object fragments.

The proxy service module 316 may provide or represent a generic server port that can be used to upload objects to services of the datacenter. For example, a new client may upload data objects to local hard drives prior to incorporating the data objects. The proxy service module 316 may allow certain functions (e.g., scrubbing, deduplication) to be performed without scanning the data in one example.

Figure 4:
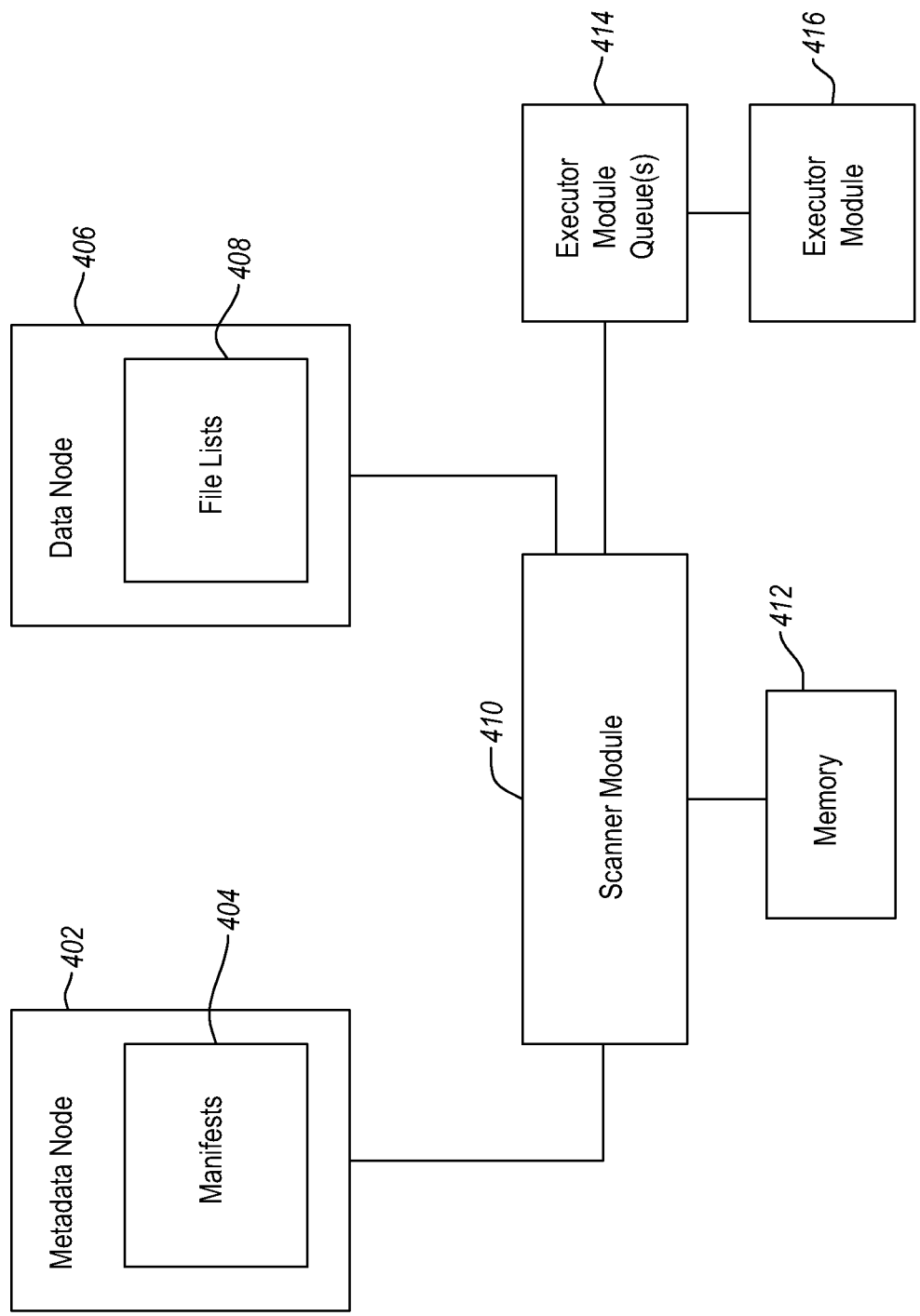
FIG. 4 illustrates an example of a scanner module that performs a maintenance operation in a datacenter and that queues action items for an executor module.

FIG. 4 illustrates an example of a datacenter that performs a data protection operation or a maintenance operation. More specifically, FIG. 4 illustrates a scanner module 410 (an example of the scanner module 310) that is scanning the datacenter 400 to identify issues or potential issues with the data objects stored by the datacenter.

The scanner module 410 can identify issues or problems by comparing the manifests 404 stored in the metadata nodes 402 with file lists 408 of the data nodes 406. The scanner module 410 (or, more generally, the repair component) can be parallelized. In one example, an instance of the scanner module 410 or of the repair component can be running on multiple machines or nodes in the datacenter 400.

The scanner module 410 may focus on a specific portion of the data objects. As previously stated, the data objects may each be associated with a sha code or other identifier. The identifiers can be sorted and the scanner module 410 may be configured to operate on all identifiers that begin with a certain prefix (e.g., 0001). Another scanner module may operate on all identifiers that begin with a different prefix (e.g., 0002). The scanner module 410 can be parallelized in other manners.

In one example, the scanner module 410 may retrieve a range of identifiers from the manifests 404 and store the identifiers in a memory 412. Similarly, a corresponding range of entries from the file lists 408 may be retrieved and stored in the memory 412. The scanner module 410 can then effectively compare the entries in the manifests 404 with the entries in the file lists 408. The entries in the file lists 408 may actually correspond to object fragments. Alternatively, each entry corresponds to a data object and each entry is associated with an index of object fragments. As a result, the amount of data returned from or retrieved from the file lists 408 may be much larger than the amount of data returned from the manifests 404. This is because each data object typically corresponds to multiple object fragments as previously described.

The scanner module 410 can then analyze the results of comparing the manifests 408 with the file lists 408. The scanner module 410 can identify data objects that cannot be restored or repaired, data objects that can be restored or repaired, potentially duplicate data objects or duplicate object fragments, and data objects and/or object fragments that are not associated with any entries in the manifests 404. These issues identified by the scanner module 410 are place in the queues 414. In one example, the issues or entries in the queues 414 are prioritized. For example, a data object that is missing three object fragments receives a higher priority than a data object that is missing one object fragment.

In one example, The scanner module 410 may provide fragment hints to the executor module via the queues 414. For example, if the scanner module detects that a repair is needed (e.g., 9-11) object fragments exist for a particular data object, the nodes of the existing object fragments may be listed along with the identifier of the data object that needs to be repaired. The executor module can use this information to ensure that the new object fragments are optionally stored on unique nodes. In one example, the scanner module may only count one object fragment per node. This could ensure that the executor module would repair the data object such that all object fragments are on unique nodes. This could result in repairing a data object that does not necessarily need repair. During a subsequent pass, duplicate data objects would be deduplicated.

The executor module 416 then resolves the issues in the queue 414 by performing one or more of a reconstruction or repair operation, a garbage collection operation, a deduplication operation, and/or a scrubbing operation, all of which are examples of maintenance or data protection operations.

In one example, the entries in the queues may be aged to ensure that data is not inadvertently handled incorrectly. For example, a newly uploaded data object may appear in the data nodes before the corresponding entry appears in the manifests. This could result in a situation where the newly uploaded data object is identified as garbage and deleted from the data nodes. As a result, object fragments or data objects may be associated with aging. A new data object may be associated with an age window (e.g., 30 days) that prevents the repair component (e.g., the executor module) from performing certain operations (e.g., garbage collection) if the data object is too young. In another example, entries in the queues 414 may not be perform if they have been in the queues 414 for too long. In one example, garbage collection can include removing object fragments that are duplicates, removing data objects that are not referenced by any manifest.

After a scan by the scanner module, there are, by way of example and not limitation, various actions that can be performed. The actions may include one or more of are five (really four) actions that can occur after a scan: no action because the data object is complete or healthy, deduplication (remove object fragments that are redundant), repair (when less than the optimal number of object fragments are found and the data object can still be reconstructed), garbage collection (remove all object fragments associated with a data object because the data object is no longer referenced in any manifest), and scrub (some fragments exist, but not enough to reconstruct the data object). In a scrub action, an upload of the data object from the client is forced by removing the reference of the data object in the manifests. The scrub action may leave old data object fragments around but they will be garbage collected or deduplicated during the next scan after the new upload to the data center. Alternatively, the data object fragments will be deduplicated if the new uploaded data object has not changed and therefore has the same hash value. In other words, when a scrub action is performed, any remaining data object fragments will be garbage collected or deduplicated during scans that are subsequent to uploading the data object to the data center.

Figure 5:
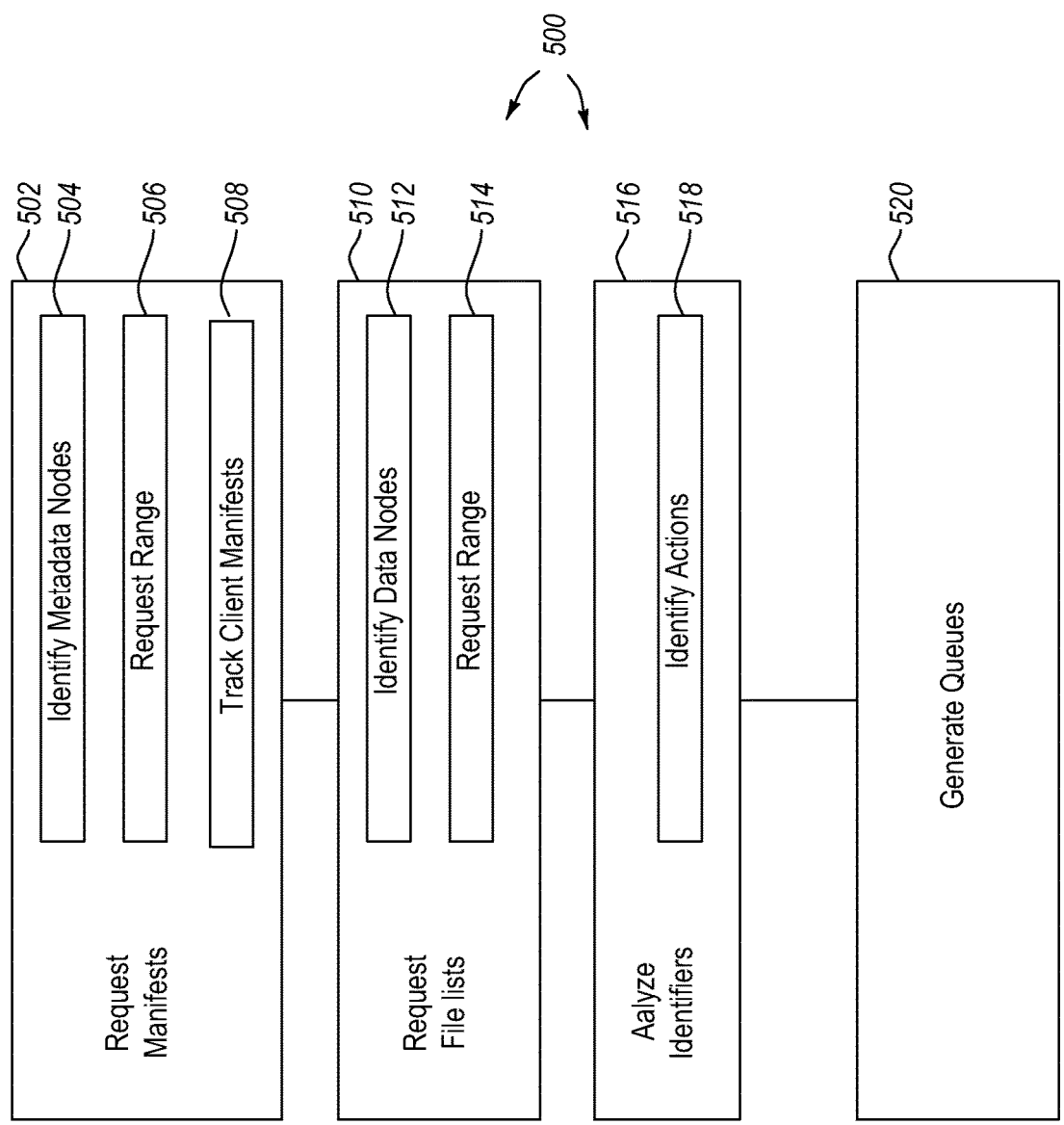
FIG. 5 illustrates an example of a method for performing a maintenance operation in a datacenter that includes scanning and analyzing user or client manifests and file lists.

FIG. 5 illustrates an example of a method for performing a maintenance operation in a datacenter. The maintenance operation performed by the method 500 can be parallelized. In block 502, the repair component (e.g., the scanner module) may request manifests (or portion thereof such as a range of entries) from the manifest nodes in the datacenter. This may include identifying the metadata nodes in block 504. The manifests received from the manifests can be stored in a persistent memory. In some examples, some of this information may already be present in the memory.

To process the manifest entries (and the file list entries described herein), the entries may be consumed quickly such that the likelihood of operating on stale memory is reduced. In this context, memory management techniques such as paging may be used when the manifests are accessed (due to the size of the manifests) or evaluated by the scanner module. The entries can be retrieved as needed in one example. The elements of requesting manifests in block 502 and requesting file lists in block 510 is an example of scanning storage devices in a datacenter or of scanning a datacenter.

In block 506, the scanner module (or other component/module) may request or access a specific range of entries. Each entry in the manifests includes at least an identifier (e.g., a sha value or fingerprint). The scanner module may request a certain range of entries for processing. In block 508, the scanner module may also track the manifests associated with the identifiers in the requested range. Tracking the manifests associated with the identifiers being evaluated allows the repair module to perform actions on the user manifests when necessary (e.g., scrub an entry from a specific manifest).

In block 510, file lists are requested or retrieved. This may include identifying data nodes in the datacenter in block 512. In one example, a range of file lists is requested in block 514. The range of file lists requested is the same range of manifest entries that was requested in block 506. In one example, the data objects are stored such that file name includes the sha code or the identifier. As a result, a range of objects can be requested using the information in the file lists.

In one example, the request for the file lists in block 510 may return the identifiers for data objects (e.g., the sha code) and an index to the object fragments.

Once these actions have been performed, the scanner module effectively may have two collections of ordered lists that correspond to manifest entries and object fragments (e.g., file segments) or data objects that are from the same range. These lists can be sorted in various manners during processing. For example, a heap data structure may be used to organize these lists and to facilitate comparison. As previously stated, these lists can be stored in memory and can be paged as needed.

In block 516, the scanner module may analyze the identifiers in the lists. This may include identifying commonality between the two lists. The scanner module, when analyzing the manifests and the file lists, can identify actions to be performed in block 518 based on the results of the analysis. The actions that can be identified or scheduled by the scanner include, by way of example only, one or more of a repair action, a scrub action, a deletion action (garbage collection action), or a deduplication action.

For example, when the scanner module determines that an entry in the manifests matches an entry in the file list, the scanner module can then determine how many object fragments are present. Using the foregoing example where the data object is divided into 12 object fragments, the action identified by the scanner module may be based on the number of object fragments that are available or that are found. If 12 object fragments are present, then no action needs to be taken. If 11 object fragments are present, then the data object or the data object identifier and other necessary information may be placed in the queue when the queue is generated in block 520. The action is to repair the data object.

More generally, an identifier may be placed in the queue for a repair action when 11, 10, or 9 object fragments are available. In this example, the repair action can generate the missing or unfound object fragments from the object fragments that have been found or that are present in the data center. The priority in the queue is higher for those data objects that have fewer number of object fragments.

When the scanner module determines that fewer than 9 object fragments are available for a given identifier that is present in the manifest, the action is to scrub the affected manifests. At an appropriate time, the corresponding entry is removed from the affected manifests. This causes the data object to be re-uploaded during the next backup operation at the client. Where appropriate, the remaining object fragments may also be deleted. For example, there may a situation where zero data object fragments for an identifier in a manifest are found. In this case, the manifest is still scrubbed such that the client uploads the data object.

When the scanner module determines that an entry in the file lists is not present in the manifest, that data object may be queued for deletion or garbage collection. When the scanner module determines that a data object is associated with more than 12 object fragments, deduplication may be performed on the object fragments.

Figure 6:
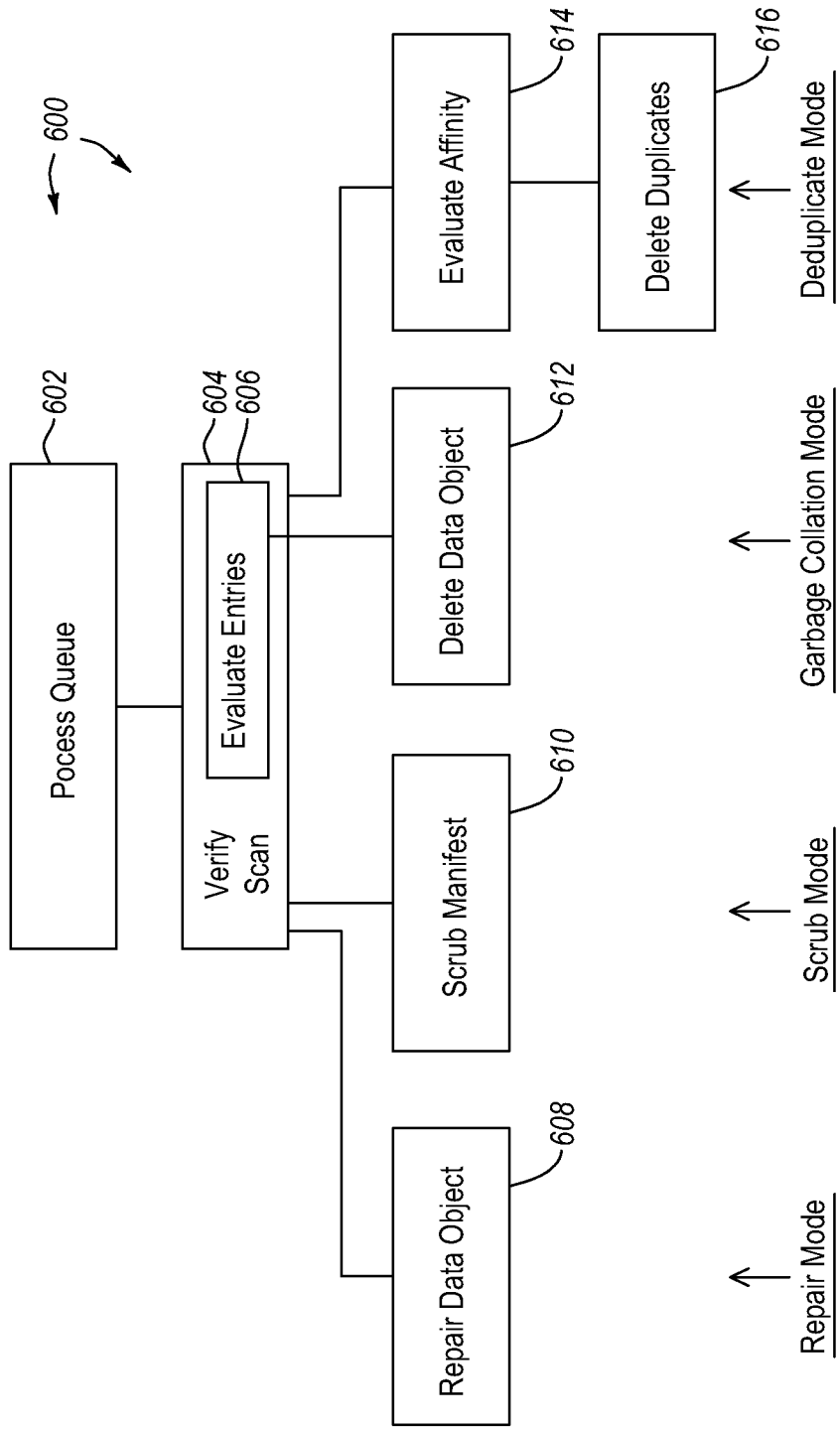
FIG. 6 illustrates an example of a method for performing actions to correct issues or problems identified by the scanning module.

FIG. 6 illustrates an example of a method for performing a maintenance operation in a datacenter. FIG. 6 illustrates an example of the maintenance operation in the context of the executor module. The method 600 often begins by processing the queue that is populated by the scanner module in bock 602. As previously stated, there may be multiple queues that are arranged in various configurations. There may be a queue for each manifest or associated with each manifest, separate queues for each type of action, or the like. The executor module may take the first entry in the queue and perform the action. The entries in the queue can be prioritized by the scanner module and/or the executor module. Multiple instances of the executor module could operate on the same or different queues.

In one example, the executor module may verify the scan performed by the scanner module in block 604. This may include evaluating the entry in block 606 based on the associated action. For example, if the entry in the queue is to repair a data object, the executor module may determine whether the data object still requires repair by determining whether all object fragments are available. For example, the executor module may perform a physical seek action for the object fragments. This could include another evaluation of the file lists. Because the number of databases is significantly reduced (compared to one database per user manifest), the verification aspect can be significantly reduced at least in terms of time.

The executor module may evaluate an age associated with the entry. The executor module may not take any action if the data object associated with the queue entry is a new data object. In one example, a new data object may be found in the data nodes before the new data object is included in the manifests. By evaluating the age, the executor module ensures that data objects that may appear to be garbage are not inadvertently deleted. If an entry in the queue is too old, no action may be taken and the scanner module can add the entry again during a later scan if necessary.

Once the executor module has verified the scan in block 604 (block 604 is optional in one example), the executor module may perform the action by operating in a repair mode. In block 608, the executor module may repair the data object identified in the queue. This can include generating the missing object fragments. In each of the actions, other appropriate actions may be performed such as updating file lists, or the like as necessary.

In block 610, the executor module may scrub a user manifest. The executor module thus operates in a scrub mode. This occurs when it has been determined that there are not enough object fragments to reconstitute or reconstruct the data object. By scrubbing the associated user manifests, the data object will be reuploaded to the datacenter.

In block 612, the executor module may delete a data object from the datacenter or identify the data object for garbage collection. This may include providing the identifier to all of the data nodes in the datacenter. The data nodes can then delete or garbage collect any relevant object fragments to ensure that the data object is deleted from the datacenter. Because the object fragments are distributed among multiple nodes, a successful deletion includes deleting all fragment objects from all nodes. The executor module thus operates in a delete mode.

The queue may include a data object for which deduplication is needed and may operate in a deduplicate mode. In block 614, the data object to be deduplicated may optionally be evaluated for affinity. For example, the object fragments may be stored on related nodes. When deduplicating the data object, the executor module may be selective by deleting the object fragments that are store on unrelated nodes. In this manner, the affinity of the data object is maintained as much as possible. In block 616, the duplicate data objects or duplicate object fragments are deleted.

The maintenance operation of maintaining the datacenter can include the methods performed by the scanner module, the methods performed by the executor module, and/or the methods of the proxy service module. These methods can be performed repeatedly and in a highly parallelized manner.

In one example, embodiments of the invention may be adapted to converting a datacenter from a datacenter where maintenance operations are centrally managed to a decentralized management system as discussed herein. In some examples, retrieving manifests, file lists, ranges of identifiers, or the like, may include retrieving this information from larger databases or from a large number of databases into fewer databases or decentralized databases. The identifiers can then be stored in persistent memory in a form convenient for use in a decentralized system.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein.

As indicated above, embodiments within the scope of the present invention also include computer storage media, which are physical media for carrying or having computer-executable instructions or data structures stored thereon. Such computer storage media can be any available physical media that can be accessed by a general purpose or special purpose computer.

By way of example, and not limitation, such computer storage media can comprise hardware such as solid state disk (SSD), RAM, ROM, EEPROM, CD-ROM, flash memory, phase-change memory ("PCM"), or other optical disk storage, magnetic disk storage or other magnetic storage devices, or any other hardware storage devices which can be used to store program code in the form of computer-executable instructions or data structures, which can be accessed and executed by a general-purpose or special-purpose computer system to implement the disclosed functionality of the invention. Combinations of the above should also be included within the scope of computer storage media. As well, such media are examples of non-transitory storage media, and non-transitory storage media also embraces cloud-based storage systems and structures, although the scope of the invention is not limited to these examples of non-transitory storage media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' can refer to software objects or routines that execute on the computing system. The different components, modules, engines, and services described herein may be implemented as objects or processes that execute on the computing system, for example, as separate threads. While the system and methods described herein can be implemented in software, implementations in hardware or a combination of software and hardware are also possible and contemplated. In the present disclosure, a 'computing entity' may be any computing system as previously defined herein, or any module or combination of modulates running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention can be performed in client-server environments, whether network or local environments, or in any other suitable environment. Suitable operating environments for at least some embodiments of the invention include cloud computing environments where one or more of a client, server, or target virtual machine may reside and operate in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer-implemented method for performing a decentralized maintenance operation in a datacenter, the method comprising:
    instantiating multiple instances of a repair component on multiple nodes in the datacenter, wherein each instance is associated with a portion of data objects stored in the data center, wherein the datacenter stores manifests that include first identifiers associated with the data objects and file lists include second identifiers that are associated with the data objects
    wherein each instance is configured to:
        determine whether data objects believed to be stored in the data center are actually stored in the datacenter based on an evaluation of a manifest and a file list;
        evaluating a portion of the first identifiers and a corresponding portion of the second identifiers to determine actions to perform on the data objects, the manifests, or the file lists based on the evaluation of the portion of the first identifiers from manifests and the portion of the second identifiers from the file lists, wherein the evaluation identifies deficiencies in the data objects represented by the manifests and the file lists and wherein the actions remedy the identified deficiencies; and
        perform the actions on the data objects, the manifest, or the file list.

2. The computer-implemented method of claim 1, wherein the datacenter includes a plurality of storage devices, the method further comprising identifying the manifests and the file lists, wherein the manifests identify the data objects believed to be stored in the datacenter and the file lists identify the data objects actually stored in the datacenter.

3. The computer-implemented method of claim 2, wherein identifying the manifests and file lists includes scanning the datacenter.

4. The computer-implemented method of claim 3, wherein scanning the datacenter includes requesting the manifests from metadata nodes, requesting the file lists from data nodes, and storing at least a part of the manifests and at least a part of the file lists in a memory, wherein each instance scans a different portion of the datacenter.

5. The computer-implemented method of claim 1, wherein each instance tracks specific manifests associated with the portion of the first identifiers and the portion of the second identifiers, wherein the portion of the first identifiers corresponds to a range of the first identifiers and the portion of the second identifiers corresponds to a range of the second identifiers.

6. The computer-implemented method of claim 1, further comprising, by each corresponding instance for a particular range of data objects:
    identifying common identifiers that are present in both the manifests and the file lists;
    identifying file identifiers that are only present in the file lists; and
    identifying file identifiers that are only present in the manifests.

7. The computer-implemented method of claim 6, further comprising deleting the data objects associated with the file indentifiers only present in the file lists or only present in the manifests.

8. The computer-implemented method of claim 6, further comprising determining whether the file lists include a full set of object fragments for each of the common identifiers.

9. The computer-implemented method of claim 8, wherein data objects that have less than a full set of object fragments are scheduled for repair as long as a number or remaining object fragments is greater than or equal to a threshold number of object fragments.

10. The computer-implemented method of claim 8, wherein when the number of remaining object fragments is below the threshold, the data object is deleted by removing an entry corresponding to the data object from the manifests.

11. The computer-implemented method of claim 8, wherein data objects associated with more than a full set of object fragments are scheduled for deduplication.

12. The computer-implemented method of claim 1, wherein the actions identified by the evaluation are entered into a queue and wherein the actions include one or more of a repair operation, a scrub operation, a deduplication operations, or a delete operation.

13. The computer-implemented method of claim 12, further comprising prioritizing the queue and providing age protections to entries in the queue such that actions are not inadvertently performed on the data objects.

14. A computer-implemented method for performing a maintenance operation in a datacenter, the method comprising:
    instantiating multiple instances of a repair component on multiple nodes in the datacenter, wherein each instance is associated with a portion of data objects stored in the data center, wherein the multiple instances cooperate to:
        scan a database stored in storage devices of the datacenter to retrieve a range of first identifiers stored in manifests and a corresponding range of second identifiers from file lists stored in the datacenter, wherein the first identifiers identify the data objects believed to be stored in the datacenter and the file lists identify the data objects actually stored in the datacenter;
        determine, based on an evaluation of the first identifiers and the second identifiers, whether data objects believed to be stored in the data center are actually stored in the datacenter;
        determine actions to perform on the data objects based on whether the data objects are actually stored in the datacenter or are only believed to be stored in the data center;
        placing an entry in a queue for each identifier that requires one of the actions; and
        performing the actions in the queue.

15. The computer implemented method of claim 14, further comprising scheduling the actions, wherein each of the actions is at least one a repair operation, a scrub operation, a deduplication operation, or a delete operation, wherein the actions remedy the deficiencies identified by the evaluation.

16. The computer implemented method of claim 15, wherein the action is the repair operation when a particular identifier of a particular data object is included in both the first identifiers and the second identifiers and a number of object fragments for the particular data object is less than a full set of object fragments and greater than or equal to a threshold number of object fragments, wherein the repair operation reconstructs the data object from the number of object fragments available for the data object;

wherein the action is the scrub operation when the number of object fragments is less than the threshold number of object fragments, wherein the scrub operation removes the identifier from the manifests, wherein the action is the deduplication operation when the number of object fragments is greater than the full set of object fragments, wherein the deduplication operation deletes duplicate object fragments, and wherein the action is the delete operation for each second identifier that is not included in the first identifiers.

17. The computer implemented method of claim 14, wherein the multiple instances operate in parallel.

18. The computer implemented method of claim 17, wherein the multiple instances operate on different portions of the manifests and different portions of the file lists.

19. The computer implemented method of claim 18, wherein each of the multiple instances is associated with a specific range of identifiers.

* * * * *